United States Patent [19]

Stewart

[11] Patent Number: 5,290,335

[45] Date of Patent: Mar. 1, 1994

[54] PLUNGER ASSEMBLY FOR FORMING GLASS CONTAINERS

[76] Inventor: William H. Stewart, 2341 Wilbur Ave., San Diego, Calif. 92109

[21] Appl. No.: 969,927

[22] Filed: Oct. 30, 1992

Related U.S. Application Data

[63] Continuation-in-part of Ser. No. 711,335, Jun. 6, 1991, abandoned, Ser. No. 610,371, Nov. 6, 1990, abandoned, and Ser. No. 468,158, Jan. 22, 1990, abandoned.

[51] Int. Cl.$^5$ ............................................. C03B 11/06
[52] U.S. Cl. ......................................... 65/362; 65/173; 65/308; 403/306; 403/349
[58] Field of Search ................. 65/305, 308, 173, 362; 403/304, 305, 306, 315, 316, 319, 348, 349

[56] References Cited

U.S. PATENT DOCUMENTS

| | | | |
|---|---|---|---|
| 2,092,060 | 9/1937 | Gairing | 403/348 |
| 2,526,998 | 1/1945 | Davis | 403/349 |
| 3,573,025 | 3/1971 | Hamilton | 65/173 Y |
| 4,033,744 | 7/1977 | Davis | 65/362 |
| 4,615,191 | 10/1986 | Grandy | 403/349 |
| 4,636,240 | 1/1987 | Kozora | 65/362 X |
| 4,763,778 | 8/1988 | Fedderson | 403/348 |
| 4,836,839 | 6/1989 | Trahan et al. | 65/323 |
| 4,836,842 | 6/1989 | Trahan | 65/362 |
| 4,842,815 | 6/1989 | Cauquelin | 403/348 |

FOREIGN PATENT DOCUMENTS 57-5658  2/1946  United Kingdom ............... 403/348

Primary Examiner—Robert L. Lindsay

[57] ABSTRACT

An improved mechanism for securing a parison molding cone atop the plunger shaft of a glass container-moulding machine. A one piece collar is secured to the head of the shaft by a bayonet tongue-and-groove assembly. The collar has a crenulated inwardly projecting flange around its upper rim. The base of the molding cone has an outwardly projecting crenulated flange around its lower rim. The flanges of each part are shaped and dimensioned to mesh together, thus allowing the flanged part of the base to be inserted into the top section on the collar then rotated into a locking position. Two spring-loaded locking members mounted into the collar engage recesses in the flange of the molding cone in order to prevent rotation of the molding cone away from its engaged position. A locking pin located in a vertical channel in the collar when forced down by the cone engages a recess or groove in the shaft and is locked there permanently by the cone while it remains in its engaged position. This positive means of locking; keeps the collar which is subjected to millions of cycles of high impact stresses, from rotating to an unsafe position during the hot and severe vibratory glass molding operations.

Large cooling air passages are embodied in the collar that permit more efficient discharge of hot air from the core of the molding cone.

7 Claims, 2 Drawing Sheets

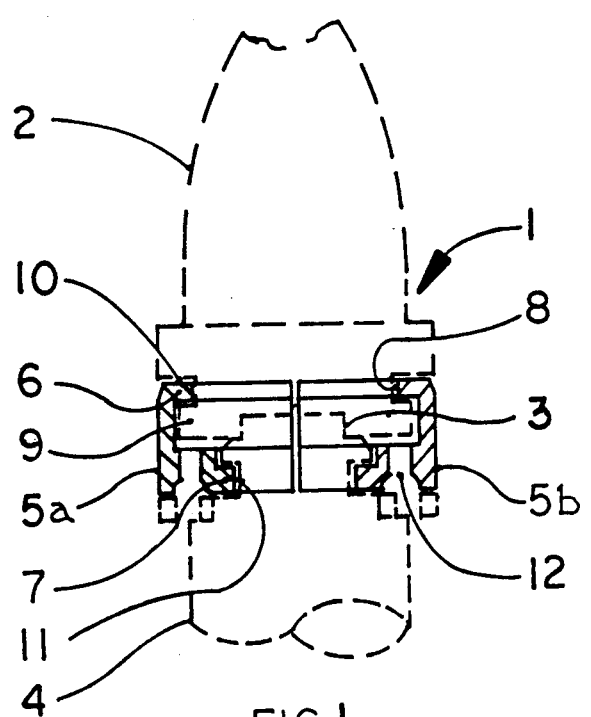
FIG 1
(PRIOR ART)
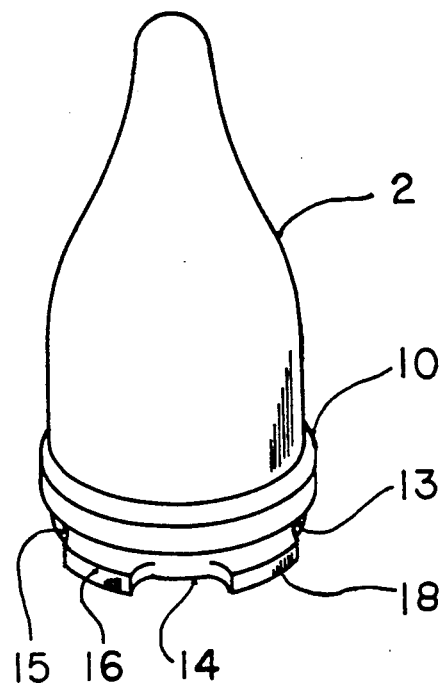
FIG 8
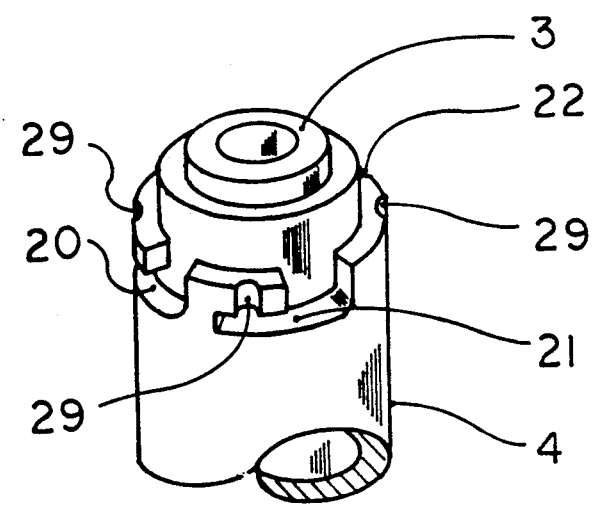
FIG 7
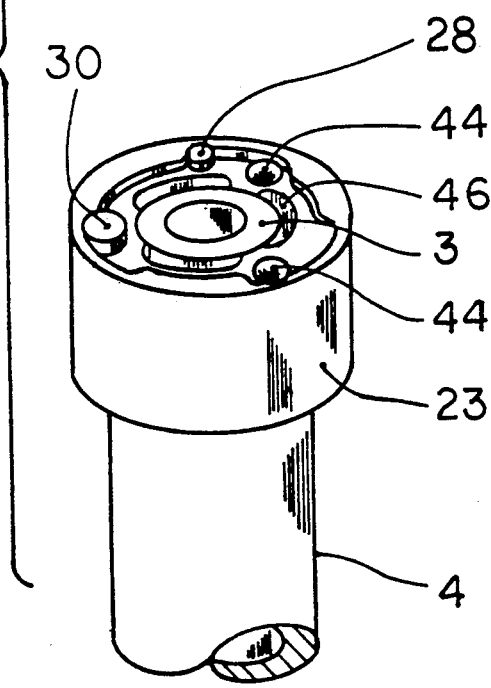

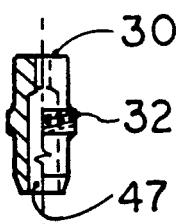
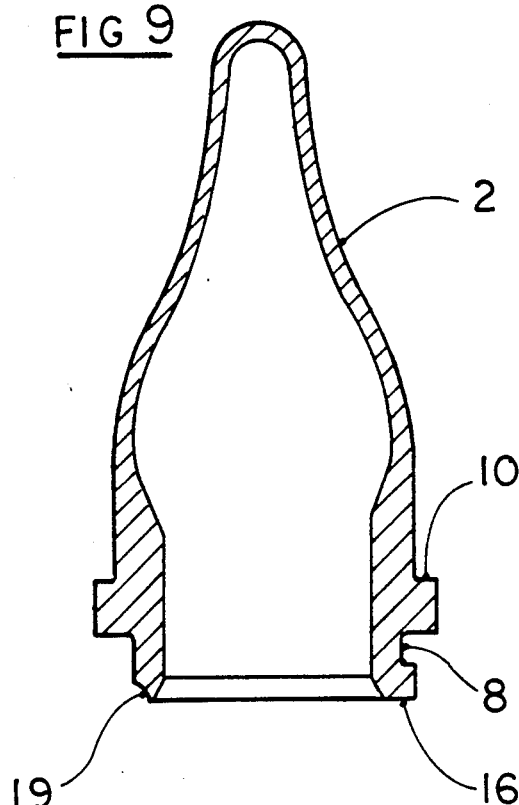
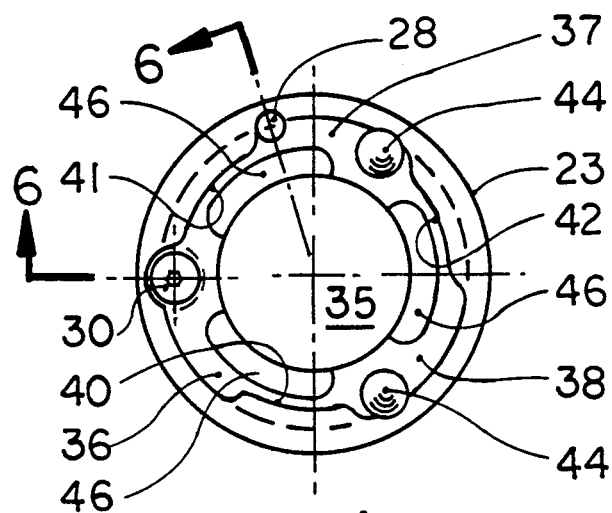
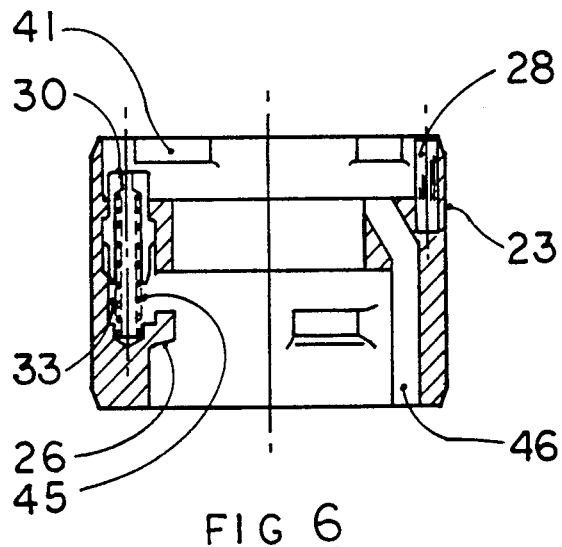
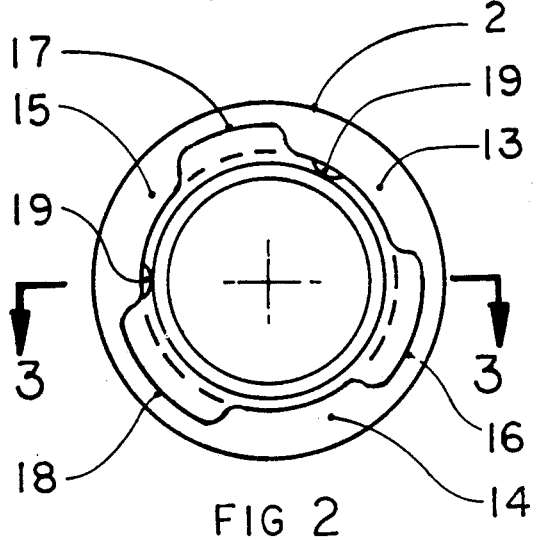
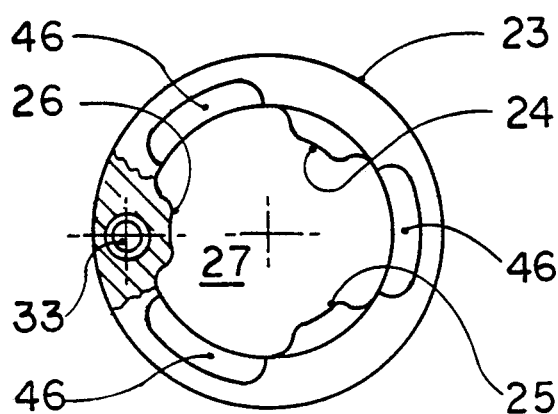

PLUNGER ASSEMBLY FOR FORMING GLASS CONTAINERS

PRIOR APPLICATION

This is a continuation-in-part application of Ser. No. 07/711,335 filed Jun. 6, 1991, a continuation-in-part of Ser. No. 07/610,371 filed Nov. 6, 1990 and a continuation-in-part of Ser. No. 07/468,158 filed Jan. 22, 1990, now abandoned.

BACKGROUND OF THE INVENTION

This invention relates to quick release mechanisms, and more specifically to adaptor collars used to releasably secure a tool at the end of a handle or shaft that can operate reliably in a vibratory and hot environment.

Such a mechanism is used in glass container molding machines to mount on a plunger shaft, a generally bottle-shaped form used to penetrate a molten glass ingot and pre-shape it into a parison, which is then inflated into a mold cavity. The surface deterioration imposed upon the form by the repeated impact on the molten glass requires its frequent replacement. That replacement must be accomplished quickly in order to minimize the interruption of the chain manufacturing pace of the apparatus. Furthermore, the form must be replaced while it still remains a very high degree of temperature.

A split adaptor collar has been used to secure the form on its supporting shaft. The two halves of the collar encircle the grooved head of the shaft and the grooved base of the form. The two halves are usually held in place by friction without any need for any type of complex or hard-to-manipulate fastener. This type of mechanism allows quick dismounting for the form with minimum manipulation.

However, due to the relatively unsecured and unstable mounting, the two halves of the collar tend to separate during the thrusting movement of the form into the molten glass ingot, and to rub against the walls of the surrounding guiding cylinder. Due to this abrasive action, small metal particles split away from the cylinder wall and penetrate the molten glass causing weakness points in some of the glass containers.

In some later devices the split collar which was used to secure the plunger to the head of the shaft has been replaced by a solid collar or sleeve as disclosed in U.S. Pat. No. 4,636,240 Kozora. A spring-biased bayonet-type interconnection between the sleeve and the plunger, allows for quick removal and replacement of the plunger. The sleeve itself is secured to the head of the shaft by screws. However, the intense shocks and vibrations to which such an assembly is subjected during parison-forming operations tends to overcome the spring pressure which locks the bayonet connector, and to loosen the screws that secure the sleeve to the shaft. None of the prior art securing devices known to the inventor is able to reliably prevent spontaneous disengagement of the plunger in such a demanding environment. Other pin devices that secure collars to shafts etc., and cited as prior art e.g. Davis ('998), Caquellin et al ('815), Fedderson et al ('778), Jamison ('658) and Davis ('191) rely purely on spring bias means of retention. Thus far locking devices that depend entirely on spring retention for engagement have not proved to withstand the severe operating conditions, that these particular collars are subjected to in the harsh environment peculiar to the glass industry.

In some of the above cited prior arts, external tools or manual manipulation must be employed for disengaging the pins. The prevailing limited access in a hot enclosure renders these approaches unworkable.

Because of the fact that no satisfactory mechanism thus far has proved to operate reliably in the severe environmental conditions that exist, there is a very real need for a more efficient and reliable mechanism between the components of parison-forming plunger assemblies in the glass industry.

SUMMARY OF THE INVENTION

The principal and secondary objects of this invention are to provide an improved mechanism for quickly and safely mounting and dismounting the molding device of a glass container manufacturing apparatus at the end of a thrust plunger shaft that is mounted inside a cylinder, to securely lock said molding device and said mechanism to the shaft. All of which operate in a high impact, high temperature and a severe vibration environment. A further objective is to prolong the life cycle of the molding device by providing larger cooling air exhaust passages in the mechanism that will facilitate larger volumes of cooling air to pass from the extremely hot (1000° C. plus) molding cone or molding device to the exhaust orifices down stream.

These and other objectives are achieved by means of a one piece collar which is secured to the head of the shaft by means of a bayonet-type attachment and a locking pin which is an integral part of the collar. The collar with its internal bayonet-type tongues, is secured to the shaft when the tongues engage external bayonet-type grooves provided on the shaft. The integral locking pin when moved down axially by the interfacing molding cone, slides into a recess in the shaft to prevent rotation of the collar, thus locking it securely to the shaft. The collar has an upper inwardly facing circular flange with crenulations shaped to mesh with and allow the outwardly projecting crenulated flange of the molding cone to pass through, thus facilitating the assembly of both parts together. The molding cone is mounted on the collar by first an axial movement that brings the crenulations at its base, into the upper cylindrical recess of the collar, then passing below the crenulated flange of the collar. A clockwise rotating movement of the cone until it reaches a stop, brings the crenulations of the cone under the crenulations of the collar, thus preventing axial withdrawal of the molding cone. Two spring-biased locking members mounted in the collar pop up to engage recesses provided in the base of the cone, thus securing the cone in its engaged position.

BRIEF DESCRIPTION OF THE DRAWING

FIG. 1 is cross-sectional view of a type of split-collar used in the prior art to secure a plunger cone (shown in phantom lines) on the head of a plunger shaft (also shown in phantom lines);

FIG. 2 is a bottom plan view of a modified plunger cone according to the invention;

FIG. 3 is a cross-sectional view taken along line 3—3 of FIG. 2;

FIG. 4 is a top plan view of one piece collar according to the invention;

FIG. 5 is a bottom plan view thereof;

FIG. 6 is a cross-sectional view taken along line 6—6 of FIG. 4;

FIG. 7 is a perspective view of the head of the plunger shaft;

FIG. 8 is a perspective, exploded view of the plunger cone attaching mechanism; and FIG. 9 is a cross-sectional view of the locking pin.

DESCRIPTION OF THE PREFERRED EMBODIMENT OF THE INVENTION

Referring now to the drawing there is shown in FIG. 1 a glass container molding assembly 1 which is typical of the prior art. A molding cone 2 is mounted on the head 3 of a plunger shaft 4 (all shown in phantom lines), by means of a split adaptor collar 5. An upper flange 6 in the two halves of the split collar 5 engage an annular groove 8 between two flanges 9, 10 in the base of the mold 2. A lower flange 7 engages in annular groove 11 around the head of the shaft 4. Cooling air passages 12 are provided in the body of the split collar. The two halves 5a and 5b of the collar are held in place by their frictional engagement around the base of the cone and the head of the shaft.

The preferred embodiment of the invention illustrated in FIGS. 2 through 9 is shown as an improvement over the just described prior art in FIG. 1 and over subsequent devices that do not perform reliably in an extremely hot vibratory environment.

As illustrated in FIGS. 2 and 3, the contour of the lower flange on the base of the molding cone 2 has been ground to form three crenulations 13, 14 and 15 separated from one another by a distance generally equal to the width of each crenulation. The unground areas between the crenulations form three tongues or dentilations 16, 17 and 18. Crenulation 13 is slightly longer than the other two and the adjacent tongue 17 is shorter than the other two tongues.

The split adaptor collar of the prior art has been replaced by a one piece collar 23 illustrated in FIGS. 4 through 6. This new collar which embodies larger air flow passages 46 has an inwardly-facing radial flange around its upper aperture 35. The flange is shaped so as to create three notches or crenulations 36, 37 and 38. Each pair of adjacent crenulations is separated by an inwardly-projecting tongue or dentilation 40, 41 and 42. Each dentilation is configured to be a little shorter in length than the adjacent crenulation.

It can now be understood that the tongues 16 through 18 on the base of the molding cone 2 can mesh with and pass through the matching notches 36 through 38 in the upper rim of the collar. The molding cone 2 is mounted on the collar 33 by first bringing the two components axially together, aligning the tongues on the base of the cone with the notches of the collar, then lowering it until the tongues pass below the collar tongues 40 through 42. The cone is then rotated clockwise until the cone tongue 17 stops against the pin 28. This brings each one of the cone tongues directly under one of the dentilations on the collar. At this point spring biased locking members 44 in the collar, engage recesses 19 in the molding cone base, thus securing it in its fully engaged position. A counter clockwise rotation of the cone will initially depress the locking members 44. Further rotation, i.e. reversing the above sequence, will allow the cone to be disassembled from the collar.

A new geometry or envelope for the head 3 of the shaft 4, is illustrated in FIG. 7 and is characterized by the addition of three peripheral bayonet grooves 20, 21 and 22 as shown on the drawing. Corresponding internal bayonet type lugs 24, 25, and 26 as shown in FIG. 5 that are located in the lower cavity 27 of collar 23 engage the bayonet grooves in the head 3 of the shaft 4 when the collar is secured to the shaft. This is accomplished by lowering the collar 23 axially until the lugs 24, 25 and 26 slide into the grooves 20, 21 and 22 on the shaft. The collar is then rotated clockwise to its fully engaged position.

The collar 23 is securely locked over the head 3 of the shaft 4 by a pin 30 which protrudes vertically from the inner wall of the collar. When the molding cone 2 is placed in its engaged position on the collar 23, the locking pin 30 is forced downwards and slides into one of three recesses 29 in a peripheral section of the head of the shaft just above the bayonet grooves 20 through 22. This positively locks the collar to the shaft thus preventing any rotational movement that would dislodge the collar when it is subjected to the high impact stresses imposed on the collar during the glass molding operation.

The locking pin 30 which is movable vertically i.e. axially within the wall of collar 23 is spring biased upwards to the unlocked position. It is mounted in a channel 33 that is counter bored vertically through the wall of collar 23. The spring biased pin 30 is retained in its position by a shallow depth shoulder (threaded) at the top end of channel 33. When held in its down position, it is in its locked position. When the pin is in its disengaged or "up" position, the collar may be assembled or disassembled from the shaft. The pin 30 illustrated in FIG. 9, has an internal channel 47 to accommodate the spring 45 and an external shallow depth shoulder 32 (threaded) which facilitates firstly its installation and secondly its retention in channel 33.

It should be understood that the number of tongues or dentilations and crenulations or notches could be varied from a minimum of two to a number in excess of three.

The above described parison molding assembly provides for the safe and rapid replacement of the molding cone, while assuring a reliable attachment under the most severe working conditions.

This particular one-piece collar configuration also embodies larger cool air flow passages which facilitates greater cooling characteristics that will help extend the life cycle of the molding cone substantially.

Auxiliary mechanisms and structures inside the molding cone and collar which are not relevant to the invention have been omitted from the drawing for convenience and clarity.

While the preferred embodiment of the invention has been described, modifications can be made and other embodiments may be devised without departing from the spirit of the invention and the scope of the appended claims.

What is claimed is:

1. In a glass-container-making apparatus wherein a generally bottle shaped form is used to penetrate molten glass ingot, is removably attached on a vertical plunger shaft by a collar capturing the base of the form and the head of said shaft, the improvement which comprises:

a collar secured to head of said shaft and having a portion extending the above head of said shaft to form a cavity or recess;

the cavity in the lower end of said collar having at least two spaced apart lugs extending radially and inwardly from the said lower cavity of said collar;

said head of shaft having at least two bayonet-type grooves shaped and dimensioned to mesh with and radially engage said lugs of said collar, a pin movable within an axially oriented channel of said collar, said pin being shaped and dimensioned to, in a first position to engage a notch or recess in a side of the head of said shaft, and in a second position, withdraw out of said notch of said shaft as said form is disengaged from said recess in said collar;

one or more spring biased locking members vertically oriented in said collar, said locking member is sized and shaped to engage notches in the flange of said form.

2. The improvement of claim 1, which further comprises resilient means for biasing said pin towards said second position i.e. unlocked retracted position.

3. The improvement of claim 2, wherein said resilient means comprises a coil spring in said axially oriented channel pressing said pin towards said upper disengaged position.

4. The improvement of claim 2, wherein said locking pin comprises an external threaded shoulder for assembly and retention in said channel of said collar.

5. The improvement of claim 2, wherein said locking pin has an internal cavity to receive said coil spring.

6. The improvement of claim 1 wherein said collar comprises large unobstructed air flow cavities.

7. The improvement of claim 1, wherein said axially oriented channel of said collar has a threaded portion at its upper end for the assembly and retention of said locking pin.

* * * * *